United States Patent Office 3,697,247
Patented Oct. 10, 1972

3,697,247
ELIMINATION OF MAGNESIUM GELS IN LIQUID AND SUSPENSION FERTILIZERS DERIVED FROM WET ACID
Thomas M. Jones, Sheffield, and Alva W. Frazier, Florence, Ala., assignors to Tennessee Valley Authority
No Drawing. Continuation of application Ser. No. 81,591, Oct. 16, 1970, now Defensive Publication T889,024. This application Apr. 1, 1971, Ser. No. 130,488
Int. Cl. C05b 7/00
U.S. Cl. 71—34
7 Claims

ABSTRACT OF THE DISCLOSURE

A method for preventing formation of or destroying strong resinous-like gels in liquid and suspension fertilizer products resulting from the ammoniation of wet-process orthophosphoric acids containing relatively high magnesium and low aluminum congeneric impurities as well as polyphosphates either added thereto or formed in situ therein in such a manner as not to substantially delete the congeneric fluorine impurities content level. The method consists of adding aluminum as a soluble compound to the wet-process acid to increase the weight ratio $Al_2O_3$:MgO to at least about 1. Typically, wet acids prepared from North Carolina rock as well as some western rock, unless specially treated, display a weight ratio $Al_2O_3$:MgO of less than 1 and usually in the range from about 0.5 to about 0.8.

The invention herein described may be manufactured and used by or for the Government for governmental purposes without the payment to us of any royalty therefor.

This application is a continuation of application Ser. No. 81,591, filed Oct. 16, 1970, now Defensive Publication T889,024 for Elimination of Magnesium Gels in Liquid and Suspension Fertilizers Derived From Wet Acid.

Our invention relates to a new method for maintaining during prolonged storage periods the fluid condition of liquid and suspension ammonium polyphosphate fertilizers derived at least in part from wet-process phosphoric acid. In particular, it relates to the elimination of resinous, glass-like gels which are caused by formation of complex magnesium reaction products in ammonium polyphosphate suspension and solution fertilizers prepared by the ammoniation of phosphoric acids of the wet-process type, which glass-like gels completely destroy the fluidity of the fertilizers. Still more particularly it relates to either the prevention of formation of strong magnesium-containing gels or destruction of the gels once they are formed by a method of complexing the gel-forming constituents present in the solution or suspension fertilizers which contain both polyphosphates and ammoniated wet-process phosphoric acid. Our invention is directed toward prevention of gel formation that occurs in ammonium polyphosphate fluid fertilizers produced by ammoniation of wet-process orthophosphoric acids having relatively high magnesium and low aluminum congeneric impurity contents and to which are added or which in situ are formed polyphosphates in a manner such as not to greatly alter the impurity level of the congeneric impurity fluorine.

The art of producing liquid and suspension fertilizers is known and well described in the literature. See, for example, U.S. Pats. 2,950,961, Striplin et al., Aug. 30, 1961; 3,109,729, Slack et al., Nov. 5, 1963; 3,113,858, Slack et al., Dec. 10, 1963; 3,326,666, Walters, June 20, 1967; 3,096,170, Newsom, July 2, 1963; and 3,234,004, Smith et al., Feb. 8, 1966. The most common method of producing solution and suspension fertilizers containing both nitrogen and phosphate is by ammoniation of phosphoric acids. In the early 1950's electric-furnace orthophosphoric acid was ammoniated to form an 8–24–0 grade liquid fertilizer. Subsequently, TVA demonstrated that superphosphoric acid could be produced commercially and could be used in preparation of solutions of higher grades such as 10–34–0 and 11–37–0. These grades of fertilizer solutions are presently being produced commercially by procedures such as those disclosed in '961, Striplin, supra. Still more subsequently, suspension fertilizers which contain crystals of fertilizer salts suspended in saturated solutions were developed and higher grades of fluid fertilizers than available in the prior art (12–40–0 or 13–41–0 v. 11–37–0) were prepared commercially. Nitrogen compounds such as urea or urea-ammonium nitrate and potassium compounds such as potassium chloride were added to the ammoniated phosphoric acid solutions and suspensions to give mixed fluid fertilizers with various ratios and grades.

Fluid fertilizers produced at the present time have compositions similar to those of commercially available dry mixed fertilizers and they display certain important advantages over the dry mixes in that costs of handling and shipping are less and application to the soil is somewhat simplified. Raw-material costs for fluid fertilizers made from electric-furnace phosphoric acid have been relatively high and the fluids produced, in some instances, have not been competitive strictly on an economical basis with solid fertilizers. Since wet-process phosphoric acid costs less per unit of $P_2O_5$ than electric-furnace acid, its use in preparation of liquid and suspension fertilizers has oftentimes been attempted. However, the grades of fluid fertilizers were lower than those made from electric-furnace acids because of numerous factors including impurities in such wet-process acids and the attending voluminous precipitates formed when such acids were ammoniated. The impurities not only diluted the fertilizer, but also frequently reacted with the primary nutrients and precipitated as fine crystalline salts or amorphous solids. In liquids, these particles are undesirable because they cause cloudiness, and the larger particles settle to the bottom of the container. In suspensions, the viscosity increases as a result of weak iron and aluminum gels and the suspension grades have to be reduced by dilution with water to decrease the viscosity.

In the past decade, it has been found that polyphosphates in combination with wet-process phosphoric acids will sequester the congeneric impurities. The polyphosphates in combination with such wet acids could either be formed in situ by the heat-treating of merchant grade wet acid followed by a subsequent ammoniation step, as in 3,192,013, Young, or formed in situ in the wet acids during the combined ammoniation and condensation of the merchant-grade wet acid, as in the direct process described in 3,382,059, Getsinger. Still another alternative is to add the polyphosphates during or shortly after the ammoniation of merchant-grade wet acid by prior art methods to thereby impart to the ammoniated merchant-grade acid the presence of the impurity sequestering polyphosphates, as in 3,015,552, Striplin et al. Since wet-process acids contain impurities in various amounts and proportions, the amount of polyphosphate needed for sequestering the impurities in the fertilizer products varied.

Of the various methods and means available to the industry for preparing liquid fertilizer solutions and/or suspensions from wet-process phosphoric acid, a consideration of all of the factors involved including location of rock, transportation facilities, fossil fuel cost, etc., now lead many in the industry to look at but two routes from phosphate rock to such fluid fertilizers as being perhaps the most economical under present conditions.

One of these routes (1) is the use of the direct process (as in Getsinger '059 supra) using the heat of ammoniation to convert merchant-grade wet-process phosphoric acid to an ammonium polyphosphate melt or possibly solution in preference to using the indirect process (as in Young '013 supra) of separately concentrating the acid by application of heat thereto followed by the later ammoniation thereof. The economics of the Getsinger process over that of Young seem to be more favorable at the present time.

The other major route (2) followed at the present time is to start with merchant-grade wet-process phosphoric acid, i.e., about 54 percent $P_2O_5$, and ammoniate it under the conditions referred to by both Young and Getsinger as prior art, i.e., ammoniating ortho acid without any in situ formation of polyphosphates therein which procedure yields a thick pasty slurry normally characterized by properties which are both undesirable and unwieldly to handle. However, in this second route, as has been practiced now for several years (as in U.S. 3,015,552, Striplin et al.), the addition to the thick, pasty slurry of a material such as 12-40-0 prepared by the ammoniation of superphosphoric acid either by a process identical or similar to that shown in '961, Striplin et al., supra, or by similarly ammoniating as in said '961 either the "blend" of wet super and furnace super acid, as in 3,507,614, Striplin, or the cleaned-up product therefrom described in U.S. application Ser. No. 76,228, Scheib et al., filed Sept. 28, 1970. In this latter route, the addition of a 12-40-0 material which usually contains upwards of about 80 percent of the $P_2O_5$ therein in the ammonium polyphosphate form to the thick, pasty slurry of ammoniated merchant-grade wet acid supplying in the resulting material in amounts of up to about 25-38 percent of the total $P_2O_5$ yields a final product having about 20 to 30 percent polyphosphate and produces as a clear liquid a grade of 10-34-0 and as a suspension material a grade of 13-39-0. It should be noted that the ammoniated thick, pasty slurry of merchant-grade acid, according to the second route, contains no polyphosphate formed in situ, but obtains values therefor from that added thereto and contained in the 12-40-0.

The phosphate ore generally located geographically in and about the State of North Carolina, or similar phosphate ores, for example some western U.S. ores, have been tapped for the production of wet-process phosphoric acid and the industries working thereon have attempted to follow either one of the two routes just mentioned. Unfortunately, in these endeavors they have been beset by a multitude of problems relating to the formation of strong magnesium containing gels in the ammonium polyphosphate fertilizers produced by either route 1 or route 2, supra. These gels set up in a solid-like form which, in a container, will not pour therefrom and which, when the container is completely inverted, remain in the bottom portion thereof. In liquid fertilizers, the gels show little or no signs of precipitates or solid impurities as is the problem in the work confronting Frazier in his copending application Ser. No. 30,264, filed Apr. 20, 1970, and assigned to the assignee of the present invention. We have found that those gel formations can be attributed to a number of factors naturally occurring in the products made as described in routes 1 and 2 supra, and for purposes of characterization thereafter these gels will be referred to as magnesium gels. We have also discovered, however, that factors in this magnesium gel formation are the congeneric impurities content level of magnesium, aluminum and fluorine, as well as polyphosphate.

Thus, for instance, we have found that when a material produced by either route 1 or 2 supra, and containing usually from about 0.15 up to usually not more than 0.3 percent fluorine, is treated with additional soluble fluorine sources to increase the total fluorine content in the product to at least the range of about 0.7 percent on a total weight basis, the magnesium gel formation is also completely alleviated, i.e., it will not form in materials to which such amounts of soluble fluorine sources are added, or in the event that the magnesium gel has already formed in the ammoniated polyphosphate material, the addition of greater amounts of soluble fluorine material thereto will eventually "break" the gel. It should be understood, however that the delineation or addition of fluorine is not the primary concern of this invention. That is to say, in certain simulated acids disclosed in later portions of this discussion wherein the fluorine levels were purposely fixed at very low levels or at very high levels, the resulting formulations represented areas of the phase diagram of this system outside where the magnesium gel is formed. The low fluorine levels are interesting only from an academic point of view in that regardless of whether the acid made from North Carolina rock is ammoniated as merchant-grade acid to which 12-40-0 is added or is converted to ammonium polyphosphate by either the Young or the Getsinger process, the resulting fluorine content in the end product is still inherently high enough to place the resulting formulation in that portion of the phase diagram of this system comprising aluminum, magnesium, fluorine, orthophosphoric acid, and polyphosphoric acid, to ensure the formation of the magnesium gel. On the other end of the ledger, however, the addition of fluorine to such wet acid may have a more practical significance; however, this embodiment for adding substantial amounts of fluorine more closely approximates the teachings in the copending application of Frazier, supra, although it should be understood that the amount of fluorine added thereto to break the gel is greater than required to satisfy Frazier's "Sequestration Ratio" in said copending application.

We have therefore found that strong magnesium gels form when wet-process orthophosphoric acids (i.e., merchant-grade containing about 52-55 percent $P_2O_5$ on a weight basis) that were low in aluminum content and high in magnesium content, such as those made from North Carolina ores or certain western U.S. rock, are used in the manufacture of liquids or suspension fertilizers that also contained polyphosphates. The strong gels render the solutions or suspensions totally unacceptable as fluid fertilizers in that they cannot be pumped, poured, or applied to the soil and neither dilution with reasonable quantities of water nor addition of more polyphosphate decreases the strength of the gel so that it would be rendered acceptable as a fluid fertilizer. This strong gel is observed to form only in fertilizer solutions and suspensions that contain magnesium, polyphosphates, fluorine, and insufficient amounts of aluminum to prevent its formation. When polyphosphates were absent, the magnesium precipitated as $MgNH_4PO_4 \cdot H_2O$ or

$$MgNH_4PO_4 \cdot 6H_2O$$

crystals. With polyphosphates present equal to or above 16 percent of the total $P_2O_5$,

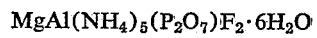
$$MgAl(NH_4)_5(P_2O_7)F_2 \cdot 6H_2O$$

crystals formed along with the formation of the strong magnesium polyphosphate gel. With fluorine absent, the magnesium precipitated as $Mg(NH_4)_2P_2O_7 \cdot 4H_2O$ crystals. The crystals themselves do not severly damage the characteristics of the suspensions but formation of the strong magnesium-polyphosphate gel is a serious problem to the manufacture of fluid fertilizers because a large segment of the natural phosphates, i.e., North Carolina rock, contains impurities that are by mother nature proportioned to cause this gelation problem in fluid fertilizers.

The impurities in wet-process acids vary widely. They may contain impurities that vary in amounts from near zero for each constituent to about 4 percent $SO_4$, 4 percent $Fe_2O_3$, 3 percent $Al_2O_3$, 1.5 percent MgO, 1.5 percent F and other impurities. The variation is primarily dependent upon the source of the phosphate ore; however, variations in amounts of impurities are also caused by methods and operating procedures used in producing the acids.

We have determined that merchant-grade wet-process phosphoric acids made from North Carolina rock have compositions which are typical of the two analyses tabulated below:

TYPICAL COMPOSITION RANGE OF MERCHANT-GRADE WET-PROCESS PHOSPHORIC ACID DERIVED FROM NORTH CAROLINA ROCK

| $P_2O_5$ | CaO | $Al_2O_3$ | $Fe_2O_3$ | MgO | F | $SO_3$ | Water insolubles |
|---|---|---|---|---|---|---|---|
| 53.4 | 0.0 | 0.7 | 1.3 | 1.0 | 0.4 | 3.0 | 0.04 |
| 52.8 | 0.1 | 0.7 | 1.3 | 1.1 | 0.6 | 2.6 | 0.04 |

The above tabulated compositions of acids made from North Carolina rock are dictated by the natural occurring deposit and the impurities therein. Elsewhere in this description of our invention we show "simulated" wet-process acids from North Carolina rock, some of which have impurity content levels above or below the ranges given in the above table for the purpose of illustration and comparison. It should be noted that these simulated acids which have impurity levels outside the ranges shown in the table above are set forth herein for purposes of illustration as to the effect of the aluminum to magnesium ratio on gel formation and these same compositions in numerous instances overlap impurity levels found in wet-process phosphoric acids derived from other ore sources such as, for instance, Moroccan rock, Florida pebble, and western U.S. rock.

We have discovered that when merchant-grade wet-process acids with high magnesium and low aluminum content, such as those made from North Carolina ores, as well as added or in situ formed polyphosphates are used in preparation of fluid fertilizers, as described above, formation of the strong gel can be avoided by addition of small amounts of a soluble aluminum compound such as phosphate, sulfate, nitrate, chloride as well as aluminum pickling liquors which complexes with the gel-forming elements. Alternatively, aluminum metal as well as aluminum-bearing ores may be dissolved in the phosphoric acid prior to ammoniation to fluid fertilizers. We have also found that addition of soluble aluminum to solutions or suspensions that are badly gelled will cause destruction of the gel and restore them to an acceptable fluid condition. We have found further that the amount of excess magnesium over aluminum required for effecting strong gel formation in the fluid fertilizers may be as low as 0.1 percent MgO. The average MgO content of three-component mixed fluid fertilizers prepared from wet-process acids containing high magnesium and low aluminum such as acids produced from North Carolina phosphate are about 0.3 percent; the $Al_2O_3$ content averages about 0.2 percent. When acids with about these ratios of impurities were used by the fertilizer industry in production of ammonium polyphosphate fluid fertilizers, the unfortunate formation of magnesium polyphosphate gels occurred which not only rendered the fluid fertilizers unfit for use but caused serious handling and transportation problems. Since the gel does not always form during preparation or even immediately after preparation of the fluid fertilizers, the problem is even more serious to the fertilizer industry because gel formation may occur at all process and handling points between the manufacturer and the farmer. The problems encountered by the manufacturer may be plugged valves, lines, and gelled products which act as solids in storage tanks. Drastic measures may be required for removal of the gelled products because normal methods such as dilution with small amounts of water only increased the strength of the gel. Similarly, addition of larger proportions of polyphosphate were also unsuccessful. It is, therefore, after the product leaves the manufacturer that the gelation problems become most complicated. Here means of removing the gelled products are not available or practical. For example, strong acids cannot be used to dissolve these gels from river barges, railroad tank cars, or farm machinery. Likewise, because of the characteristic properties of a gel, all sections of the gelled products must be agitated separately since one part may be agitated to a fluid condition without affecting the unagitated sections. Also, the fluids must be immediately poured, pumped, or drained from their container when they become fluid because this gel immediately reforms when agitation is discontinued.

It is therefore the principal objective of the present invention to eliminate this gel-forming property of ammonium polyphosphate fertilizer solutions and suspensions derived in whole or in part from wet-process phosphoric acid. Our invention is not directed primarily toward the prevention of crystalline precipitates in production of ammonium polyphosphate solutions and suspensions primarily derived from the ammoniation of phosphoric acids, as taught by Frazier in application Ser. No. 141,366 which was a continuation of Ser. No. 82,809 filed Oct. 21, 1970 and now Def. Publ. T890,010 which was a continuation in part of Ser. No. 30,264, filed Apr. 20, 1970, and now abandoned and assigned to the assignee of the present invention, but rather to prevention of gel formation and/or destruction of formed gels in such ammonium polyphosphate solution or suspensions derived from wet acids of the type above described.

In carrying out the objects of our invention, we have found that for our invention to be most effective, the aluminum content should be held within a certain concentration range relative to the magnesium content. For typical fluid fertilizers prepared from wet-process phosphoric acids and for many simulated fluid fertilizers prepared from reagent-grade laboratory materials, it was found that the optimum aluminum content required for prevention of the strong gelatinous magnesium-polyphosphate-fluorine complex was essentially equal to the magnesium content. A large increase in soluble aluminum over and above the atomic ratio of Al:Mg=1 effectively prevented formation of the strong magnesium polyphosphate gel or rapidly redissolved it once it was formed. However, it also required more polyphosphate to sequester the excess aluminum or required a reduction in grade by dilution with water. Otherwise, the formation of gelatinous aluminum orthophosphate presented a problem of unacceptably high viscosity.

In order that those skilled in the art may better understand how the present invention may be practiced, the following examples of our method for improving ammonium polyphosphate fluid fertilizers by either prohibiting formation or destruction of magnesium polyphosphate gel formation are shown for purposes of illustration only. The examples are offered principally to show the extent of the complexing power that the aluminum has on the gel-forming constituents and should not in any way limit the invention. Neither do the values of the impurities, magnesium and fluorine, used in the examples limit the compositions at which aluminum will complex these gel-forming ions.

EXAMPLE I

An ammonium polyphosphate base suspension with grade 13–39–0 (1.5 percent clay) was prepared by adding wet-process orthophosphoric acid (52.8 percent $P_2O_5$, 3.2 percent $SO_4$, 0.6 percent F, 1.3 percent $Fe_2O_3$, 1.1 percent MgO, 0.7 percent $Al_2O_3$, and 0.1 percent CaO) and ammonia gas simultaneously to a heel of ammonium polyphosphate base suspension (grade 12–40–0, 80 percent of the $P_2O_5$ as polyphosphate) and water at rates required for maintaining pH about 6.1. Production temperature was limited to about 180° F. About 60 percent of the total $P_2O_5$ was supplied as wet-process orthophosphoric acid and 40 percent as 12–40–0. Attapulgite clay (1.5 percent) was added as the suspending agent.

During storage a strong gel formed in the suspension, and it acquired characteristics of a solid, which made the suspension unsatisfactory. After 30 days of storage at 100° F. and at 80° F., the viscosities measured at 80° F. were 3400 and 1650 cp., respectively, and the suspension was nonpourable. After 60 days of storage, the viscosities had further increased to 8000 and 1700 cp., respectively, and the suspensions had the appearance of solids. The gel was broken repeatedly with a high-speed stirrer, but is immediately reformed.

EXAMPLE II

A soluble aluminum compound (hydrated aluminum orthophosphate) was added to wet-process orthophosphoric acid drawn from the same source as in Example I supra to increase the $Al_2O_3$ content from 0.7 to 1.5 percent. The acid was then used in preparation of an ammonium polyphosphate base suspension as described in Example I above. After storage for 90 days at 100° or 80° F., the suspension was completely fluid (viscosities of 900 and 750 cp., respectively, measured at 80° F.), and it was otherwise in satisfactory condition.

EXAMPLE III

An ammonium polyphosphate base suspension with grade about 13-38-0 was prepared by adding the wet-process acid (described in Example I) and ammonia to a heel of ammonium polyphosphate base suspension (grade 12-40-0, 80 percent of the $P_2O_5$ as polyphosphate) and water at rates required for maintaining pH about 6.3. About 80 percent of the $P_2O_5$ was supplied as the wet-process acid and 20 percent as 12-40-0. Attapulgite clay (1.5 percent) was added as the suspending agent.

Before storage, the suspension contained large quantities of solids and a gel formed. The viscosity measured at 80° F. was 8500 cp. During storage, the gel strength increased. After 30 days of storage at 100° F. and 80° F., the viscosities measured at 80° F. were 76,000 and 10,000 cp., respectively, which made the suspension unsatisfactory.

EXAMPLE IV

A soluble aluminum compound (hydrated aluminum orthophosphate) was added to wet-process orthophosphoric acid, as in Example II above, to increase the $Al_2O_3$ content from 0.7 to 1.6 percent. The acid was then used in preparation of an ammonium polyphosphate base suspension as described in Example III. After storage for 30 or 60 days at 100° and 80° F., there was no strong gel and the suspension was fluid. The viscosities, after storage at 100° and 80° F., were 2800 and 1800 cp., respectively, measured at 80° F. as compared with 76,000 and 10,000 for the suspensions without added aluminum.

EXAMPLE V

An ammonium polyphosphate base suspension, with pH 6.3 and grade 13-38-0 (1.5 percent clay), containing 60 percent of the $P_2O_5$ as the wet-process acid (Example I) and 40 percent as the 12-40-0 was prepared by the procedure described in Examples I, II, and III. A gel formed in the suspension during storage that made it unsatisfactory for use. After 90 days at 100° and 80° F., the viscosities measured at 80° F. were 4000 and 1500 cp., respectively.

EXAMPLE VI

A soluble aluminum compound (hydrated aluminum orthophosphate) was added to the same source wet-process orthophosphoric acid to increase the $Al_2O_3$ from 0.7 to 1.1 percent (Al:Mg atomic ratio near 1.0). A suspension made with the acid under procedures described in Examples I, II, and III did not have a strong gel formed in it during storage. After 90 days at 100° and 80° F., the viscosity measured at 80° F. was 580 and 310 cp., respectively.

EXAMPLE VII

An ammonium polyphosphate, three-component (N-P-K) liquid fertilizer with grade 7-21-7 was prepared by ammoniating wet-process orthophosphoric acid (51.7 percent $P_2O_5$, 3.4 percent $SO_4$, 0.5 percent F, 1.4 percent $Fe_2O_3$, 1.0 percent MgO, and 0.6 percent $Al_2O_3$) and adding ammonium polyphosphate solution (11-37-0) and potassium chloride (62 percent $K_2O$). About 33 percent of the $P_2O_5$ in the solution was added as the 11-37-0 solution (78 percent of the $P_2O_5$ as polyphosphate). After 14 days at 80° F., a strong gel formed making the 7-21-7 solution unacceptable as a liquid fertilizer.

Cold mixing the solution with 0.5 percent $Al_2O_3$ by weight as a soluble aluminum compound (amorphous $AlPO_4$) destroyed the gel and gave the solution acceptable fluid properties.

EXAMPLE VIII

An ammonium polyphosphate base solution (10-33-0) was prepared from reagent-grade materials. The solution contained 67 percent of the $P_2O_5$ as orthophosphate and 33 percent as pyrophosphate. MgO, 0.7 percent; $Fe_2O_3$, 0.5 percent; F, 0.6 percent; and $Al_2O_3$, 0.4 percent, were added as impurities. During storage at 100° F., a strong gel formed. After 14 days of storage, the solution had the appearance of a clear, transparent solid and was completely unpourable, which made it unsatisfactory as a solution fertilizer.

EXAMPLE IX

The following polyphosphate fertilizer fluids are given to show the effect that increasing the $Al_2O_3/MgO$ value has on the gel-forming characteristics of fluid fertilizers. Crystalline precipitates were frequently obtained as indicated but did not significantly affect the fluid condition of the fertilizer. The polyphosphate level varied from 20 to 40 percent of the total $P_2O_5$.

| | Fluid fertilizer composition, wt. percent | | | | | |
|---|---|---|---|---|---|---|
| N | $P_2O_5$ | MgO | $Al_2O_3$ | F | $Al_2O_3$/MgO | Solid phase |
| 10 | 34 | 1.0 | 0.2 | 0.4 | [1] 0.2 | Bad gel—plus $Mg(NH_4)_2P_2O_7 \cdot 4H_2O$. |
| 10 | 34 | 1.0 | 0.5 | 0.4 | [1] 0.5 | Bad gel—plus $Mg(NH_4)_2P_2O_7 \cdot 4H_2O$ plus $MgAl(NH_4)_5(P_2O_7)_2F_2 \cdot 6H_2O$. |
| 10 | 34 | 0.7 | 0.4 | 0.3 | [1] 0.57 | Bad gel—no precipitate. |
| 12 | 40 | 0.65 | 0.41 | 0.33 | [2] 0.63 | Bad gel—plus $MgAl(NH_4)_5(P_2O_7)_2F_2 \cdot 6H_2O$. |
| 10 | 34 | 1.0 | 0.7 | 0.4 | [1] 0.7 | Moderate gel—plus $MgAl(NH_4)_5(P_2O_7)_2F_2 \cdot 6H_2O$. |
| 10 | 34 | 1.0 | 1.0 | 0.4 | [1] 0.85 | Very weak gel—plus $MgAl(NH_4)_5(P_2O_7)_2F_2 \cdot 6H_2O$. |
| 10 | 34 | 0.51 | 0.46 | 0.5 | [1] 0.90 | $MgAl(NH_4)_5(P_2O_7)_2F_2 \cdot 6H_2O$—no gel. |
| 12 | 40 | 0.33 | 1.0 | 0.41 | [2 3] 3.1 | Do. |
| 12 | 40 | 0.16 | 1.4 | 0.64 | [2 3] 9.1 | Do. |
| 713 | 18 | 0.03 | 1.48 | .23 | [2 4] 50 | Do. |

[1] Simulated products.
[2] Commercial products.
[3] Normal run-of-the-mill fluid product made from Florida rock, Moroccan rock and similar high-quality phosphate ore.
[4] Special type of fluid product prepared from spent pickling acid procured from aluminum processing.

EXAMPLE X

An ammonium polyphosphate base solution (10-33-0) was prepared by the same method and from the same reagent materials as in Example VIII above. The only exception was that the $Al_2O_3$ content of the solution was increased from 0.4 to 1.0 percent. The solution was stored at 100° F. along with the solution in Example VIII. After 14 days of storage, this solution was examined along with the solution in Example VIII. There was no gel present, but some solids had precipitated. Storage was continued for an additional 76 days (90 days total) and during the additional storage period no gel formed. Likewise, this same gelled product was prepared and the increased aluminum content was obtained from aluminum chloride, aluminum nitrate, aluminum sulfate and hydrated aluminum hydroxide. In all of these tests the gel was dissipated to give acceptable fluid fertilizers, showing that the form of the aluminum is not significant but only that it is soluble in phosphoric acid.

EXAMPLE XI

The solution compositions cited in the following table are given as examples of ungelled, completely fluid 10-34-0 type of liquid fertilizers prepared from laboratory chemicals of reagent grade quality at a polyphosphate content of 50 percent of the total $P_2O_5$ content. The nitrogen content was not determined; however, the pH was adjusted to 6 with $NH_4OH$. These samples were maintained at 80° F. for a minimum of three weeks without gel formation. These data are given to demonstrate $Al_2O_3$ to MgO values to which gelled products may be adjusted for the purpose of complexing the gel-forming constituents.

SOLUTION COMPOSITIONS, WEIGHT PERCENT

| MgO | $Al_2O_3$ | F | $P_2O_5$ | $Al_2O_3/MgO$[1] |
|---|---|---|---|---|
| 0.51 | 0.46 | 0.78 | 37.1 | 0.90 |
| 1.70 | 1.80 | 2.50 | 34.2 | 1.05 |
| 1.45 | 1.50 | 2.10 | 35.6 | 1.03 |
| 0.55 | 0.56 | 0.82 | 31.6 | 1.05 |
| 1.75 | 1.80 | 2.30 | 38.8 | 1.03 |

[1] $Al_2O_3/MgO$ weight ratio equivalent to Al:Mg atomic ratio of 0.8.

EXAMPLE XII

The fluid fertilizer compositions given in the following table are those of several commercial 10-34-0 products prepared from wet-process phosphoric acids and stored for six months at 80° F. without the formation of gelatinous phases. As in Example X, these data are given to demonstrate the fertilizer compositions to which gelled products may be adjusted for the purpose of complexing the gel-forming constituents. These products did contain a minor quantity of crystalline precipitate as

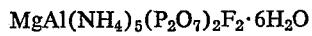

$MgAl(NH_4)_5(P_2O_7)_2F_2 \cdot 6H_2O$ but this did not have a significant effect on the fluid properties of the products.

FLUID FERTILIZER COMPOSITION, WEIGHT PERCENT

| N | $P_2O_5$ | MgO | $Al_2O_3$ | F | $Fe_2O_3$ | $Al_2O_3/MgO$[1] |
|---|---|---|---|---|---|---|
| 10.6 | 34.3 | .46 | .74 | .73 | .81 | 1.61 |
| 10.9 | 33.6 | .40 | .80 | .80 | .40 | 2.00 |
| 10.3 | 35.0 | .27 | .45 | .46 | .70 | 1.67 |
| 10.9 | 33.4 | .32 | .64 | .66 | .73 | 2.00 |

[1] $Al_2O_3/MgO$ weight ratio equivalent to Al:Mg atomic ratio of 0.8.

We claim:

1. A process for avoiding the formation of gels in fluid ammonium polyphosphate fertilizers including solutions and suspensions, said fluid ammonium polyphosphate fertilizers derived at least in part from phosphoric acid of the wet-process type, said phosphoric acid of the wet-process type containing normal congeneric impurities including aluminum, iron, magnesium, and fluoride in a ratio wherein the natural abundance of said magnesium is from about 1.4 to about 5.0 times by weight greater than the natural abundance of said aluminum, which process comprises increasing the amount of aluminum ultimately present in said ammonium polyphosphate fluid fertilizers such that the weight ratio $Al_2O_3:MgO$ is equal to at least about 0.9, said process for avoiding said gel formation in said fluid fertilizers characterized by maintaining the physical characteristics of same as easily pumpable, pourable, gel-free solutions and/or suspensions.

2. The process of claim 1 wherein said weight ratio of $Al_2O_3:MgO$ is at least about 1.

3. The process of claim 1 wherein said weight ratio $Al_2O_3:MgO$ is in the range from about 1 to about 2.

4. The process of claim 1 wherein the avoidance of said gel is effected past said gel formation.

5. The process of claim 1 where, in the step of increasing the amount of aluminum ultimately present in said fluid fertilizers, the source of said aluminum is selected from the group consisting of aluminum phosphate, aluminum sulfate, aluminum nitrate, aluminum chloride, aluminum pickling liquors, and mixtures thereof.

6. The process of claim 5 wherein the aluminum source is selected from the group consisting of aluminum phosphate, aluminum sulfate, aluminum nitrate, aluminum chloride, aluminum pickling liquors, and mixtures thereof, and is added to said fluid polyphosphate fertilizers.

7. The process of claim 5 wherein said aluminum source is added to said wet-process phosphoric acid prior to the ammoniation thereof, which ammoniation results in the production of stabilized polyphosphate fluid fertilizers.

References Cited

UNITED STATES PATENTS

| 3,041,160 | 6/1962 | Makower et al. | 71—64 C |
| 3,290,140 | 12/1966 | Young | 71—64 C X |
| 3,459,499 | 8/1969 | Mullen | 71—34 X |
| 3,357,813 | 12/1967 | Elson | 71—34 X |
| 3,490,892 | 1/1970 | Simpson | 71—34 |
| 3,582,311 | 6/1971 | Browder et al. | 71—34 UX |

OTHER REFERENCES

Jones et al., Def. Pub. of Ser. No. 81,591—filed Oct. 16, 1970—published in 889 O.G. 1367 on Oct. 31, 1971—Def. Pub. No. T889,024—71—34.

REUBEN FRIEDMAN, Primary Examiner

R. BARNES, Assistant Examiner

U.S. Cl. X.R.

71—64 C